J. DWYER.
AMMONIA GAS CONDENSER.
APPLICATION FILED DEC. 30, 1912.
1,073,746.
Patented Sept. 23, 1913.
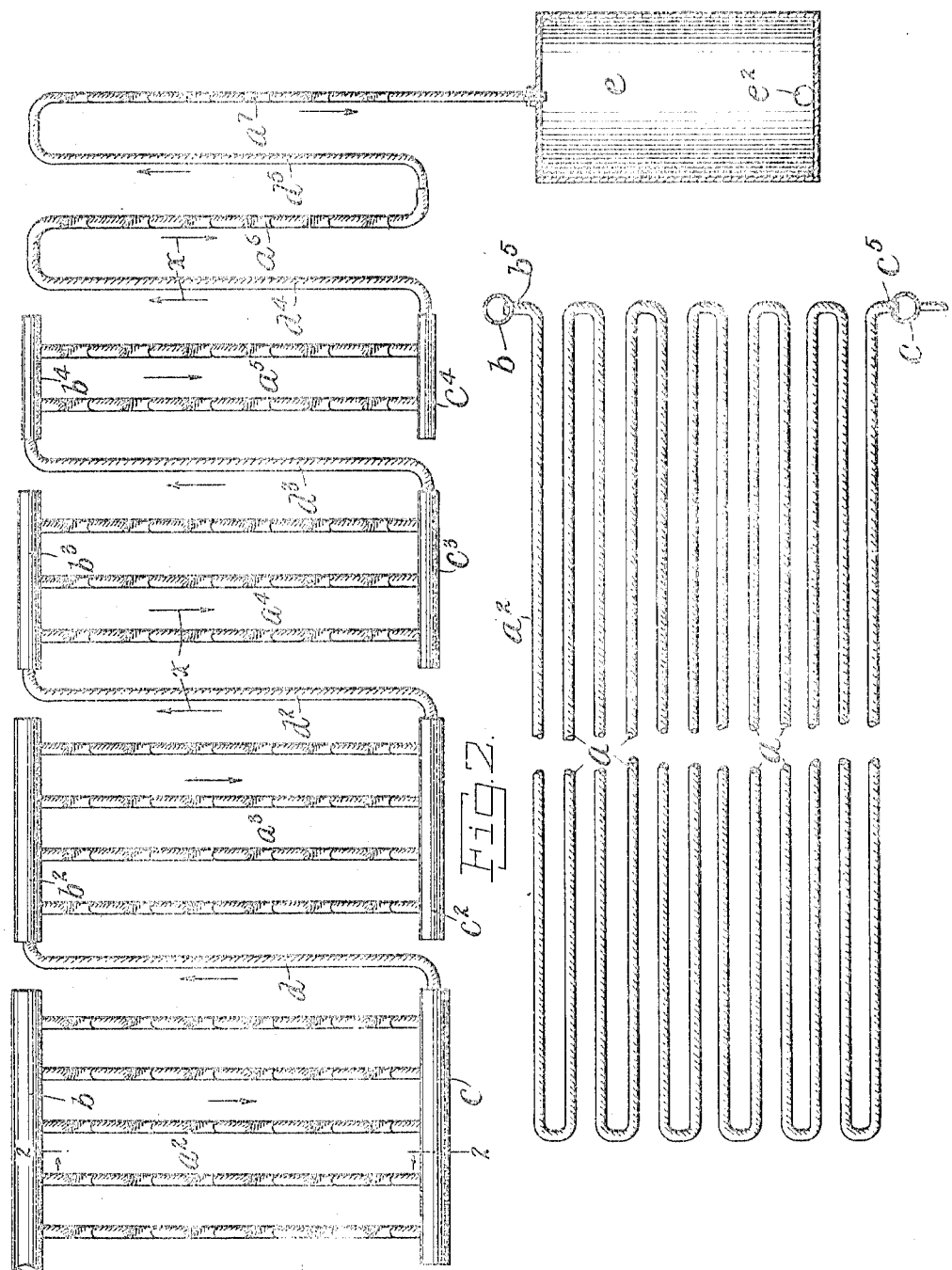
Witnesses:
H. C. Thompson.
S. Andrews.
Inventor
Joseph Dwyer.
By his Attorneys
Edgar Tate & Co.

UNITED STATES PATENT OFFICE.

JOSEPH DWYER, OF MONTCLAIR, NEW JERSEY.

AMMONIA-GAS CONDENSER.

1,073,746.  Specification of Letters Patent.  Patented Sept. 23, 1913.

Application filed December 30, 1912. Serial No. 739,185.

*To all whom it may concern:*

Be it known that I, JOSEPH DWYER, a citizen of the United States, and residing at Montclair, in the county of Essex and State of New Jersey, have invented certain new and useful Improvements in Ammonia-Gas Condensers, of which the following is a specification, such as will enable those skilled in the art to which it appertains to make and use the same.

The object of this invention is to provide an improved ammonia gas condenser of the class used in connection with ice making plants or apparatus, the construction of which is such as to facilitate the condensation of the gas and reduce the same to liquid form in the shortest time possible, and at the least expense.

The invention is fully disclosed in the following specification of which the accompanying drawing forms a part, in which the separate parts of my invention are designated by suitable reference characters in each of the views, and in which:—

Figure 1 is a side view of my improved invention, and;—Fig. 2 a vertical transverse section on the line 2—2 of Fig. 1.

In the practice of my invention I provide the usual condensing coils $a$ and arrange the same in groups $a^2$, $a^3$, $a^4$, $a^5$, $a^6$ and $a^7$, and the capacity of these groups of coils decreases in the direction of the flow of the gas which is indicated by the arrows $x$.

The decrease in the capacity of the separate groups of coils is effected, in the construction shown, by decreasing the number of series of coils in the successive groups, with the exception of the last two groups, beginning with the inlet group $a^2$, said inlet group consisting of five series of coils, the next group consisting of four series of coils, the next group consisting of three series of coils, the next consisting of two series of coils, and the last two consisting of one series each, the coils in the series constituting the last group being smaller or of less transverse dimensions than those in the series of the next preceding group.

The groups of coils $a^2$, $a^3$, $a^4$ and $a^5$ are provided with header pipes $b$, $b^2$, $b^3$, and $b^4$ which communicate with the top of each of the series of said coils at one end thereof, as shown at $b^5$, and these groups of coils are also provided with discharge headers $c$, $c^2$, $c^3$ and $c^4$ which communicate with the bottom of each series of said groups, as shown at $c^5$, and the discharge headers $c$, $c^2$, $c^3$, and $c^4$ are placed in communication with the supply headers of the successive coils by means of pipes $d$, $d^2$, and $d^3$.

The top of the group $a^6$ which consists of a single series of coils, is placed in communication with the discharge header $c^4$ of the preceding group by means of a pipe $d^4$ and the top of the last group which also consists of a single series is placed in communication with the bottom of the preceding group $a^6$ by means of a pipe $d^5$, and the bottom of the said last group $a^7$ is in communication with the usual liquid ammonia tank $e$ from which the liquid ammonia passes through an outlet $e^2$ to the ice freezing plant or apparatus, in the usual manner.

From the foregoing description, it will be seen that the ammonia gas passes downwardly through the coils of each group and in successive order and is fed into the groups following the first group $a^2$ by the pipes $d^2$, $d^3$, $d^4$ and $d^5$ through which the said gas passes upwardly, and as the gas gradually cools and condenses, the capacity of the separate groups of coils decreases, and by reason of this fact the operation of condensing the gas is more fully and completely performed.

In the accompanying drawing, I have shown only the condensing coils, but it will be understood, that my improved condenser may be used either as a double pipe condenser or as a single pipe condenser, the latter being better known as the atmosphere type.

In a double pipe condenser, cooling water is passed through the outer pipe during the process of condensing the gas, and in a single pipe condenser, such as that shown, the cooling water flows constantly over and around the pipes of the condenser, and it will be understood that when my improvement is employed in connection with, or as a double pipe condenser, all the pipes of the separate groups of coils will be inclosed by water pipes through which the cooling water passes, and when used as a single pipe condenser, suitable means will be provided for supplying the water to the separate groups of coils or the pipes thereof. It will also be observed that the capacity or dimensions of the supply heads $b$, $b^2$, $b^3$ and $b^4$ decrease in the direction of the flow of the gas, in the construction shown, as does also the capacity or dimensions of the discharge heads